US010121514B2

(12) United States Patent
Schwesinger et al.

(10) Patent No.: US 10,121,514 B2
(45) Date of Patent: *Nov. 6, 2018

(54) VIDEO PREVIEW BASED BROWSING USER INTERFACE

(71) Applicant: Microsoft Technology Licensing, LLC, Redmond, WA (US)

(72) Inventors: Mark D. Schwesinger, Bellevue, WA (US); John Elsbree, Bellevue, WA (US); David R. Fulmer, Redmond, WA (US); Evan J. Lerer, Seattle, WA (US); Stephane Joseph Comeau, Seattle, WA (US); Spencer I. A. N. Hurd, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/608,586

(22) Filed: May 30, 2017

(65) Prior Publication Data

US 2017/0264940 A1 Sep. 14, 2017

Related U.S. Application Data

(63) Continuation of application No. 14/829,164, filed on Aug. 18, 2015, now Pat. No. 9,697,870, which is a
(Continued)

(51) Int. Cl.
*H04N 5/93* (2006.01)
*G11B 27/10* (2006.01)
(Continued)

(52) U.S. Cl.
CPC .......... *G11B 27/102* (2013.01); *G11B 19/025* (2013.01); *H04N 5/44591* (2013.01);
(Continued)

(58) Field of Classification Search
CPC ..... H04N 5/44591; H04N 2005/44595; H04N 21/84; H04N 21/482; H04N 21/472;
(Continued)

(56) References Cited

U.S. PATENT DOCUMENTS 4,218,711 A * 8/1980 Kashigi ................. H04N 5/275
348/512
5,392,166 A 2/1995 Furuya
(Continued)

OTHER PUBLICATIONS

"Corrected Notice of Allowance", U.S. Appl. No. 12/958,661, dated Jun. 17, 2015, 2 pages.
(Continued)

*Primary Examiner* — David Harvey
(74) *Attorney, Agent, or Firm* — Alleman Hall Creasman & Tuttle LLP

(57) ABSTRACT

A first video preview corresponding to a first video program is played back. When it is time to transition from playing back the first video preview to playing back a second video preview corresponding to a second video program, the transition is made from playing back the first video preview to playing back the second video preview. The transition can be made by sliding the first video preview off a display while sliding the second video preview onto the display. Additionally, metadata associated with the first video program can be displayed for an amount of time before playback of the first video preview ceases, and metadata associated with the second video program can be displayed for an amount of time after playback of the second video preview begins.

12 Claims, 7 Drawing Sheets

Related U.S. Application Data continuation of application No. 12/958,661, filed on Dec. 2, 2010, now Pat. No. 9,160,960.

(51) Int. Cl.
| | |
|---|---|
| *G11B 19/02* | (2006.01) |
| *H04N 21/472* | (2011.01) |
| *H04N 5/445* | (2011.01) |
| *H04N 21/431* | (2011.01) |
| *H04N 21/44* | (2011.01) |
| *H04N 21/482* | (2011.01) |
| *H04N 21/84* | (2011.01) |

(52) U.S. Cl.
CPC ..... *H04N 21/431* (2013.01); *H04N 21/44016* (2013.01); *H04N 21/47217* (2013.01); *H04N 21/4825* (2013.01); *H04N 21/84* (2013.01); H04N 2005/44595 (2013.01)

(58) Field of Classification Search
CPC ....... H04N 21/47202; H04N 21/47217; H04N 21/431; H04N 21/4416; H04N 21/4825; G06F 3/0482; G06F 3/04815; G06F 3/0485; G06F 3/04842; G06F 17/30781; G06F 17/30861
See application file for complete search history.

(56) References Cited

U.S. PATENT DOCUMENTS

| | | | |
|---|---|---|---|
| 5,619,249 A * | 4/1997 | Billock | H04N 7/17318 348/563 |
| 5,621,456 A | 4/1997 | Florin et al. | |
| 5,623,613 A * | 4/1997 | Rowe | G06F 3/0482 348/E5.105 |
| 5,638,112 A | 6/1997 | Bestler et al. | |
| 5,682,511 A | 10/1997 | Sposato et al. | |
| 5,752,160 A | 5/1998 | Dunn | |
| 5,999,173 A * | 12/1999 | Ubillos | G11B 27/034 348/E5.056 |
| 6,453,471 B1 | 9/2002 | Klosterman | |
| 6,668,377 B1 | 12/2003 | Dunn | |
| 7,574,448 B2 | 8/2009 | Volk et al. | |
| 7,581,186 B2 | 8/2009 | Dowdy et al. | |
| 7,594,246 B1 | 9/2009 | Billmaier et al. | |
| 7,757,253 B2 | 7/2010 | Rappaport et al. | |
| 7,797,641 B2 * | 9/2010 | Karukka | G06F 3/0482 715/739 |
| 7,930,650 B2 * | 4/2011 | Brodersen | G06F 3/0486 715/810 |
| 8,020,099 B1 | 9/2011 | Lu | |
| 9,160,960 B2 | 10/2015 | Schwesinger | |
| 2002/0033848 A1 * | 3/2002 | Sciammarella | G06F 3/0481 715/838 |
| 2003/0005429 A1 | 1/2003 | Colsey | |
| 2003/0126605 A1 | 7/2003 | Betz et al. | |
| 2003/0221192 A1 | 11/2003 | Rappaport et al. | |
| 2004/0150657 A1 * | 8/2004 | Wittenburg | G06F 3/04815 345/619 |
| 2005/0025249 A1 | 2/2005 | Zhao | |
| 2005/0213944 A1 | 9/2005 | Yoo | |
| 2005/0234992 A1 * | 10/2005 | Haberman | G06F 3/0482 |
| 2005/0246759 A1 | 11/2005 | Yoshida | |
| 2005/0278656 A1 * | 12/2005 | Goldthwaite | G06F 17/30749 715/810 |
| 2006/0092295 A1 | 5/2006 | Mercer | |
| 2006/0153532 A1 * | 7/2006 | McCrossan | G11B 27/10 386/230 |
| 2006/0294476 A1 | 12/2006 | Buckley | |
| 2007/0006262 A1 * | 1/2007 | Cleron | H04N 7/17318 725/42 |
| 2007/0011702 A1 | 1/2007 | Vaysman | |
| 2007/0136750 A1 | 6/2007 | Abanami et al. | |
| 2007/0237225 A1 | 10/2007 | Luo et al. | |
| 2008/0276278 A1 | 11/2008 | Krieger et al. | |
| 2008/0313690 A1 | 12/2008 | Tsang et al. | |
| 2009/0044115 A1 | 2/2009 | Helms | |
| 2009/0158326 A1 | 6/2009 | Hunt et al. | |
| 2010/0122166 A1 * | 5/2010 | Chien | G06F 3/04817 715/716 |
| 2010/0125884 A1 | 5/2010 | Howcroft | |
| 2010/0278337 A1 | 11/2010 | Pliska et al. | |
| 2011/0154405 A1 | 6/2011 | Isaias | |
| 2011/0161923 A1 | 6/2011 | Green | |
| 2012/0072946 A1 | 3/2012 | Cranman et al. | |
| 2012/0141095 A1 | 6/2012 | Schwesinger | |
| 2013/0014152 A1 | 1/2013 | Johnson et al. | |

OTHER PUBLICATIONS

"Final Office Action", U.S. Appl. No. 12/958,661, dated Mar. 25, 2014, 9 pages.

"Final Office Action", U.S. Appl. No. 12/958,661, dated May 31, 2013, 17 pages.

"Non-Final Office Action", U.S. Appl. No. 12/958,661, dated Jan. 12, 2015, 10 pages.

"Non-Final Office Action", U.S. Appl. No. 12/958,661, dated Sep. 25, 2013, 13 pages.

"Non-Final Office Action", U.S. Appl. No. 12/958,661, dated Dec. 7, 2012, 8 pages.

"Notice of Allowance", U.S. Appl. No. 12/958,661, dated Jun. 8, 2015, 4 pages.

Oliver,"Apple expands iTunes Preview to allow browser-based song sampling", Retrieved from: <http://www.appleinsider.com/articles/10/01/07/apple_expands_itunes_preview_to_allow_browser_based_song_sampling.html> on Aug. 31, 2010, Jan. 7, 2010, 4 pages.

* cited by examiner

VIDEO PREVIEW BASED BROWSING USER INTERFACE

RELATED APPLICATION

This application is a continuation of and claims priority to U.S. patent application Ser. No. 14/829,164, filed Aug. 18, 2015, which is a continuation of and claims priority to U.S. patent application Ser. No. 12/958,661 filed Dec. 2, 2010, now issued as U.S. Pat. No. 9,160,960, all of which are incorporated by reference herein in their entirety.

BACKGROUND

Browsing through available video content is typically done based on text descriptions of the video content and/or box art images of the video content (e.g., images that are included on the box or case for a movie or other video). While such browsing techniques do allow users to identify video content, they are not without problems. One such problem is that the text and/or box art images are limited in the amount of information they can present to the user, which can make it difficult for users to identify video content that may be of interest to them.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first video preview is played back, the first video preview corresponding to a first video program. An identification is made of when it is time to transition from playing back the first video preview to playing back a second video preview, the second video preview corresponding to a second video program. In response to identifying it is time for the transition, the transition is made from playing back the first video preview to playing back the second video preview by sliding the first video preview off a display while sliding the second video preview onto the display.

In accordance with one or more aspects, a video preview is displayed on a screen, the video preview corresponding to a video program. Metadata is also displayed on the screen for a first amount of time after display of the video preview begins, the metadata being associated with the video program. Display of the metadata ceases after the first amount of time elapses, and resumes a second amount of time before display of the video preview is to cease.

BRIEF DESCRIPTION OF THE DRAWINGS

The same numbers are used throughout the drawings to reference like features.

DETAILED DESCRIPTION

A video preview based browsing user interface is discussed herein. A user can browse for video programs based on video previews that are played back to the user. The user can allow the video previews to be played back in full one after the other, or alternatively can navigate forward and/or backward through the video previews as he or she desires. When transitioning from a current video preview to a next video preview, the current video preview can be slid off the display while the next video preview is slid onto the display, with portions of both video previews being displayed concurrently during the transitioning. This sliding provides a smooth transition from one video preview to another. Additionally, when display of a video preview begins, metadata associated with the video preview can be displayed along with the video preview. The metadata is displayed for a particular amount of time, after which display of the metadata ceases. Display of the metadata also resumes a particular amount of time before display of the video preview is to cease for transition to the next video preview.

Figure 1:
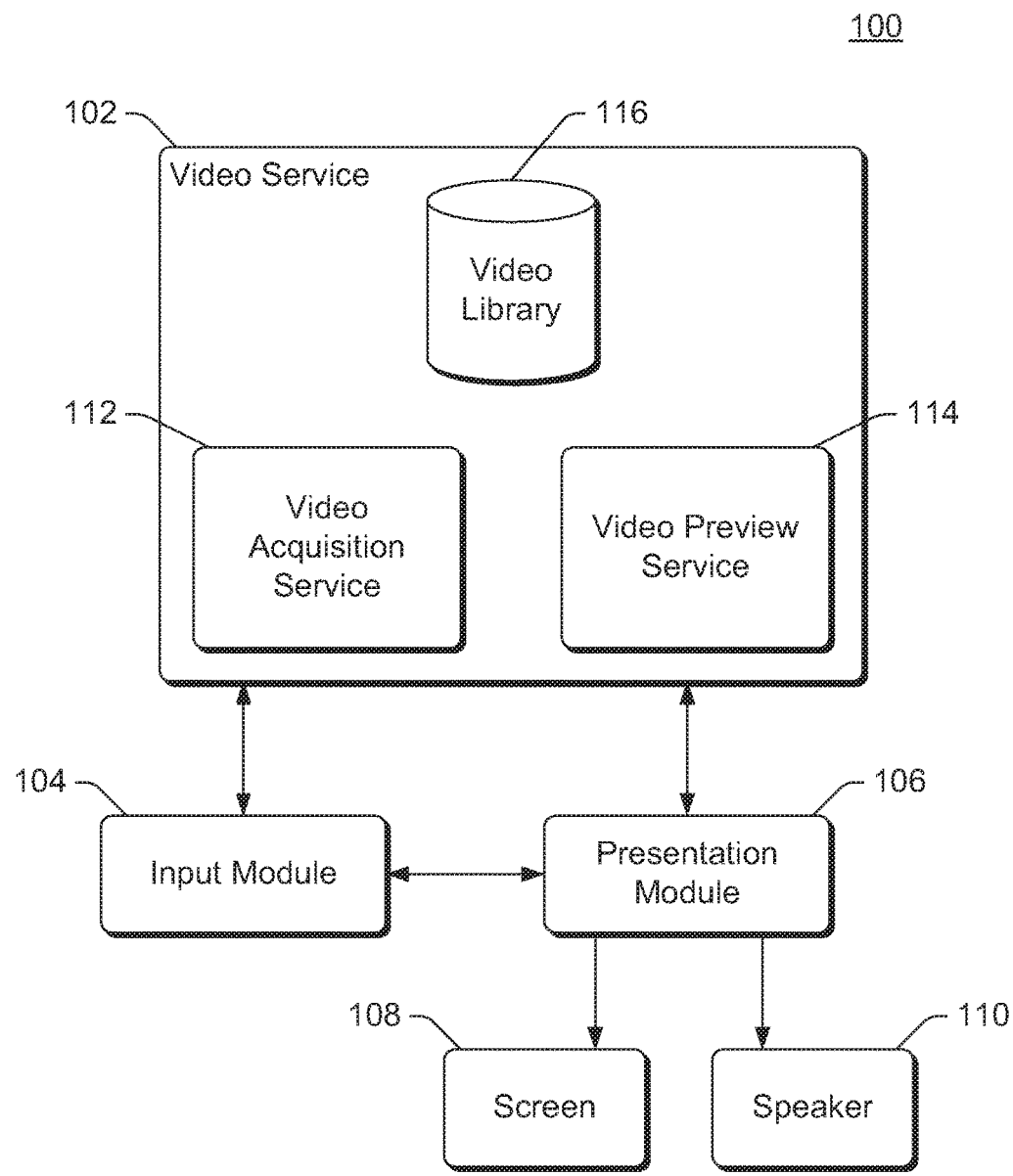
FIG. 1 illustrates an example computing system implementing the video preview based browsing user interface in accordance with one or more embodiments.

FIG. 1 illustrates an example computing system 100 implementing the video preview based browsing user interface in accordance with one or more embodiments. Computing system 100 includes a video service 102, an input module 104, a presentation module 106, a screen 108, and a speaker 110. Video service 102 also includes a video acquisition service 112, a video preview service 114, and a video library 116. Each of modules 104-106, screen 108, speaker 110, services 112-114, and library 116 can be implemented on the same device. Alternatively, modules 104-106, screen 108, speaker 110, services 112-114, and library 116 can be implemented across multiple devices in various combinations. For example, services 112-114 and library 116 can be implemented on one group of devices (e.g., one or more servers), modules 104-106 can be implemented on another computing device (e.g., a game console), and screen 108 and speaker 110 can be implemented as a separate display device (e.g., a television or monitor).

Additionally, although only one of each of modules 104-106, screen 108, speaker 110, services 112-114, and library 116 is illustrated in FIG. 1, it should be noted that computing system 100 can include any number of each of modules 104-106, screen 108, speaker 110, services 112-114, and library 116. For example, computing system 100 can include multiple input modules 104, multiple presentation modules 106, multiple screens 108, multiple speakers 110, multiple video acquisition services 112, multiple video preview services 114, and/or multiple video libraries 116. If computing system 100 includes multiple ones of any of modules 104-106, screen 108, speaker 110, services 112-

114, and library 116, these multiple ones of modules 104-106, screen 108, speaker 110, services 112-114, and library 116 can be implemented on the same or different computing devices.

One or more of a variety of different types of devices can be used to implement various ones of modules 104-106, screen 108, speaker 110, services 112-114, and library 116. Examples of such devices include desktop computers, notepad or tablet computers, netbook or laptop computers, server computers, mobile stations, entertainment appliances, set-top boxes communicatively coupled to one or more display devices, televisions or other display devices, cellular or other wireless phones, game consoles, automotive computers, and so forth. When implemented as different devices, these devices can communicate with one another in a variety of different manners. For example, devices can communicate with one another using a variety of different networks, such as the Internet, a local area network (LAN), a public telephone or other phone network, an intranet, other public and/or proprietary networks, combinations thereof, and so forth. By way of another example, devices can communicate with one another via other types of communication mechanisms or connections, such as various wired connections (e.g., universal serial bus (USB) connections, IEEE 1394 connections, etc.), various wireless connections (e.g., wireless USB connections, Bluetooth connections, etc.), combinations thereof, and so forth.

Input module 104 receives user inputs from a user of computing system 100. Input module 104 can be implemented in software, firmware, hardware, or combinations thereof. User inputs can be provided in a variety of different manners, such as by pressing one or more keys of a keypad or keyboard of system 100, pressing one or more keys of a controller (e.g., remote control device, mouse, trackpad, etc.) of system 100, pressing a particular portion of a touchpad or touchscreen of system 100, making a particular gesture on a touchpad or touchscreen of system 100, and/or making a particular gesture on a controller (e.g., remote control device, mouse, trackpad, etc.) of system 100. User inputs can also be provided via other physical feedback input to the system, such as tapping any portion of a device implementing module 104, any action that can be recognized by a motion detection component of a device implementing module 104 (such as shaking the device, rotating the device, etc.), and so forth. User inputs can also be provided in other manners, such as via audible inputs to a microphone, via motions of hands or other body parts observed by an image capture device, and so forth. These user inputs allow a user to interact with computing system 100, such as by inputting particular characters or symbols, selecting particular buttons or menu options, dragging and dropping various descriptions or images, and so forth.

Screen 108 can be implemented in a variety of different manners, such as using liquid crystal display (LCD) technology, plasma screen technology, image projection technology, and so forth. Similarly, speaker 110 can be implemented in a variety of different manners, such as a free-standing speaker, a speaker included as part of another device (e.g., a television, a wireless phone, etc.), a speaker included as part of a set of headphones, and so forth.

Presentation module 106 generates, manages, and/or outputs data to be displayed, played back, or otherwise presented to a user of computing system 100. For example, presentation module 106 manages playing back video on screen 108 for video previews received from video preview service 114, and playing back audio data on speaker 110 for video previews received from video preview service 114.

Video library 116 maintains video content that can be provided to presentation module 106 for playback. The video content includes video previews that can be provided to presentation module 106 for display, as well as video programs that correspond to (are previewed by) those video previews. Alternatively, separate video libraries can be maintained for video previews and video programs that correspond to those video previews. Video library 116 can be a particular one or more devices, a particular one or more folders, a particular one or more directories, different data storage structures, and so forth, or combinations thereof.

Video content can be stored in video library 116 in a variety of different formats, such as MP4 (MPEG-4) files, WMV (Windows Media Video) files, and so forth. Each video program and each video preview is typically stored as an individual file, although alternatively one or more video programs and/or one or more video previews can be stored in a single file. Alternatively, video programs and/or video previews can be stored in other data structures, such as tables, databases, and so forth. Oftentimes, video content has associated audio content that can be played back concurrently with display of the video content. Such audio content is typically stored with (e.g., as part of the same file) as the video content, although alternatively can be stored in other manners as associated with the video content.

Video programs include a variety of different types of programming content, such as movies, television shows, sitcoms, documentaries, music videos, news broadcasts, infomercials, and so forth. A video preview corresponding to a video program is a preview for that corresponding video program. The video preview is typically a much shorter duration than the video program (such as a 15-second or 30-second preview), and is typically designed to give the user an idea of what the video program is about. The video preview can be generated separately from the video program (e.g., by a producer or distributor of the video program), and need not include content from the video program. Alternatively, the video preview can be generated (e.g., by a producer or distributor of the video program, automatically, etc.) from the video program and include content from the video program.

In one or more embodiments, metadata is also associated with the video programs. A video preview corresponds to a particular one or more video programs, thus the same metadata that is associated with a video program is also associated with the corresponding video preview. The metadata can be stored in the same file as the video program or video preview, or alternatively can be stored in another file, table, data structure, and so forth.

A variety of different information associated with the video program can be included as metadata associated with the video program. For example, the metadata can include a title of the video program, names of one or more actors and/or one or more actresses in the video program, names of other individuals involved in creating the video program (e.g., producer, director, etc.), and/or a length of the video program (e.g., in hours and/or minutes). By way of additional example, the metadata can include a genre of the video program (e.g., comedy, drama, documentary, sports, etc.), a rating of the video program (e.g., a Motion Picture Association of America rating), a summary of the video program, box art for the video program (one or more images that are included on the box or case for a disc or other distribution medium storing the video program), and/or awards earned by the video program. It should be noted that these are examples of metadata that can be associated with the video program and that other information can alternatively be associated with the video program as metadata.

Video preview service 114 manages the retrieval of video previews from video library 116 and provides the retrieved video previews to presentation module 106. Video preview service 114 can identify which video previews to provide to presentation module 106 in a variety of different manners. In one or more embodiments, a user of computing system 100 can identify particular types or categories of video previews that are to be played back to the user. These different types or categories can be different genres (e.g., comedy, drama, family, adventure, etc.) identified by the user, different characteristics (e.g., particular words in the title of the corresponding video program, particular actors or actresses in the video program, etc) identified by the user, and so forth. A user can identify particular types or categories of video previews in different manners, such as by inputting text in a data entry field, selecting a tab or button, selecting a menu item, and so forth. The user can provide various inputs (e.g., as discussed above with reference to input module 104) to identify the particular types or categories of video previews. Alternatively, particular types or categories of video previews that are to be played back to the user can be identified in other manners, such as by another device, module, component, and so forth.

In one or more embodiments, video preview service 114 maintains or has access to a playlist of video previews to be provided to presentation module 106 for particular types or categories. For example, if the user requests video previews in the comedy genre, video preview service 114 has (or obtains) a playlist of video previews to provide to presentation module 106 for the comedy genre. The particular video previews identified in that playlist can be determined in different ways, such as by another module or device, by an administrator of video service 102, and so forth. The playlist can include identifiers of the video previews (e.g., allowing video preview service 114 to obtain the video previews from video library 116), or alternatively can include the video content (and optionally audio content) of the video preview. Although referred to herein as a playlist, it should be noted that other records and/or data structures can alternatively be used to identify the video previews to be played back.

In other embodiments, video preview service 114 searches various characteristics of the video preview in video library 116 to determine the video previews to be provided to presentation module 106. For example, if the user requests video previews for video programs including a particular actor, then video preview service 114 searches the metadata associated with the video programs to identify the video programs including that actor, and provides the video previews corresponding to those identified video programs to presentation module 106.

The video previews to be provided to presentation module 106 have an associated ordering in which they are to be played back. For example, a playlist that identifies the video previews (or alternatively includes the video content (and optionally audio content) for the video previews) can be generated that specifies the order in which the video previews are to be played back. This ordering can be determined in a variety of different manners, such as based on the order in which the video previews are identified in a record maintained or accessed by video preview service 114, alphabetically by corresponding video program title, randomly, and so forth. The playlist can be generated by video preview service 114, or alternatively generated by another device or module and obtained by video preview service 114.

In one or more embodiments, video previews are streamed from video preview service 114 to presentation module 106. Streaming of a video preview to presentation module 106 refers to the video preview being sent to presentation module 106 where playback of the video preview can begin prior to the entire video preview being sent. Thus, presentation module 106 can begin playing back the video preview prior to receiving the entire video preview from video preview service 114. It should be noted that presentation module 106 can receive the video preview from video preview service 114 directly or alternatively indirectly (e.g., via one or more intermediaries such as caches). Similarly, video preview service 114 can retrieve the video preview from video library 116 directly or alternatively indirectly (e.g., via one or more intermediaries such as caches).

When video previews are streamed from video preview service 114 to presentation module 106, fast streaming or fast start of the streamed video preview can be used. With fast streaming or fast start, the content of the video preview is initially streamed to presentation module 106 at a faster rate than is requested by presentation module 106 (or a faster rate than is typically used for playback of the video preview) in order to at least partially fill a buffer at presentation module 106 quickly. This allows presentation module 106 to begin playback of the video preview more quickly than if the video content were received at a slower stream. Thus, multiple bit rate (MBR) streaming can be used to stream video previews to presentation module 106, with higher bit rates being initially used, followed by lower bit rates after a particular amount of data has been streamed to presentation module 106.

Additionally, when video previews are streamed from video preview service 114 to presentation module 106, multiple channels for streaming video content can be used. Video preview service 114 can stream a different video preview using each channel, allowing multiple different video previews to be streamed to presentation module 106 concurrently. Presentation module 106 need not (but alternatively can) play back those different video previews concurrently. Rather, presentation module 106 can, for example, buffer or otherwise temporarily store one or more video previews while another video preview is being played back.

In other embodiments, rather than streaming video previews to presentation module 106, the video previews are provided to presentation module 106 in other manners. For example, collections of multiple video previews can be downloaded to a storage device local to presentation module 106 (e.g., a storage device included in the same computing device as implements presentation module 106) for particular types or categories (e.g., particular genres) of video previews. These can be downloaded at different times, such as times of low network activity (e.g., late night hours, early morning hours, etc.). By way of another example, collections of multiple video previews can be provided to presentation module 106 from other sources, such as portable computing devices, optical discs, flash memory devices (e.g., thumb drives or USB drives), and so forth.

Presentation module 106 plays back the video previews, displaying video content on screen 108 and playing back audio content on speaker 110. Alternatively, some video previews may include no audio content, in which case presentation module 106 plays back such video previews by displaying the video content on screen 108. The user of computing system 100 can simply watch the video previews in the order in which they are provided to presentation module 106. When presentation module 106 finishes playing back one video preview (e.g., the video content of the video preview has been played back), module 106 transitions to and begins playing back the next video preview in the playlist.

Video preview service 114 can provide video previews to presentation module 106 for playback in response to a variety of different events. For example, a user of computing system 100 can provide various inputs (e.g., as discussed above with reference to input module 104) to request that video previews be played back, such as selection of a particular video preview button or option. By way of another example, video preview service 114 can provide video previews to presentation module 106 for playback in response to a user of computing system 100 requesting access to video service 102 and/or video preview service 114, accessing a particular page or section of video service 102, and so forth.

In one or more embodiments, when a user navigates to or otherwise accesses a page, tab, section, and so forth associated with video preview service 114, video preview service 114 provides video previews to presentation module 106 for playback. Alternatively, video preview service 114 can provide an initial summary display (e.g., including titles, box art, and/or other metadata) to presentation module 106 for display on screen 108. From the initial summary display, the user of computing system 100 can request that video previews be played back, and in response to such a request video preview service 114 can provide video previews to presentation module 106 for playback.

Additionally, a user of computing system 100 can navigate through the video previews. While presentation module 106 is playing back a video preview, a user of computing system 100 can provide various requests to indicate that a different video preview is to be played back. The user requests can be, for example, a request that a next video preview in the playlist be played back, a request that the previous video preview in the playlist be played back, that another video preview be randomly selected from the playlist for playback, and so forth. In response to such a user request, presentation module 106 identifies an appropriate different video preview to be played back and beings playback of that identified video preview. The user can input such requests with various inputs (e.g., as discussed above with reference to input module 104), such as by selection of a button or menu option, a particular gesture on a touchpad or motion of the user's arms or hands, and so forth.

For example, to request that a next video preview in the playlist be played back, a user of computing system 100 can press a right arrow (or down arrow) button on a remote control device, input a gesture dragging his or her finger from right to left (or bottom to top) on a touch pad or touch screen, wave his or her arm from right to left (or bottom to top) to be sensed by a camera, and so forth. By way of another example, to request that a previous video preview in the playlist be played back, a user of computing system 100 can press a left arrow (or up arrow) button on a remote control device, input a gesture dragging his or her finger from left to right (or top to bottom) on a touch pad or touch screen, wave his or her arm from left to right (or top to bottom) to be sensed by a camera, and so forth.

In one or more embodiments, when transitioning from a current video preview to another video preview, the current video preview is slid off the display while the other video preview is slid onto the display. The display can be, for example, screen 108, a portion (e.g., window) of screen 108, and so forth. Sliding the current video preview off the display refers to gradually (e.g., over 2-5 seconds) displaying less and less of the current video preview. The current video is shifted towards one edge of the display, and portions of the current video that, if displayed, would no longer be within the display are not displayed. Similarly sliding the other video onto the display refers to gradually (e.g., over 2-5 seconds) displaying more and more of the other video preview. The other video is shifted towards one edge of the display, and portions of the other video that, if displayed, would not yet be within the display are not displayed. Portions of both video previews are displayed concurrently during the transitioning, providing a smooth transition from one video preview to another being displayed to the user.

Figure 2:
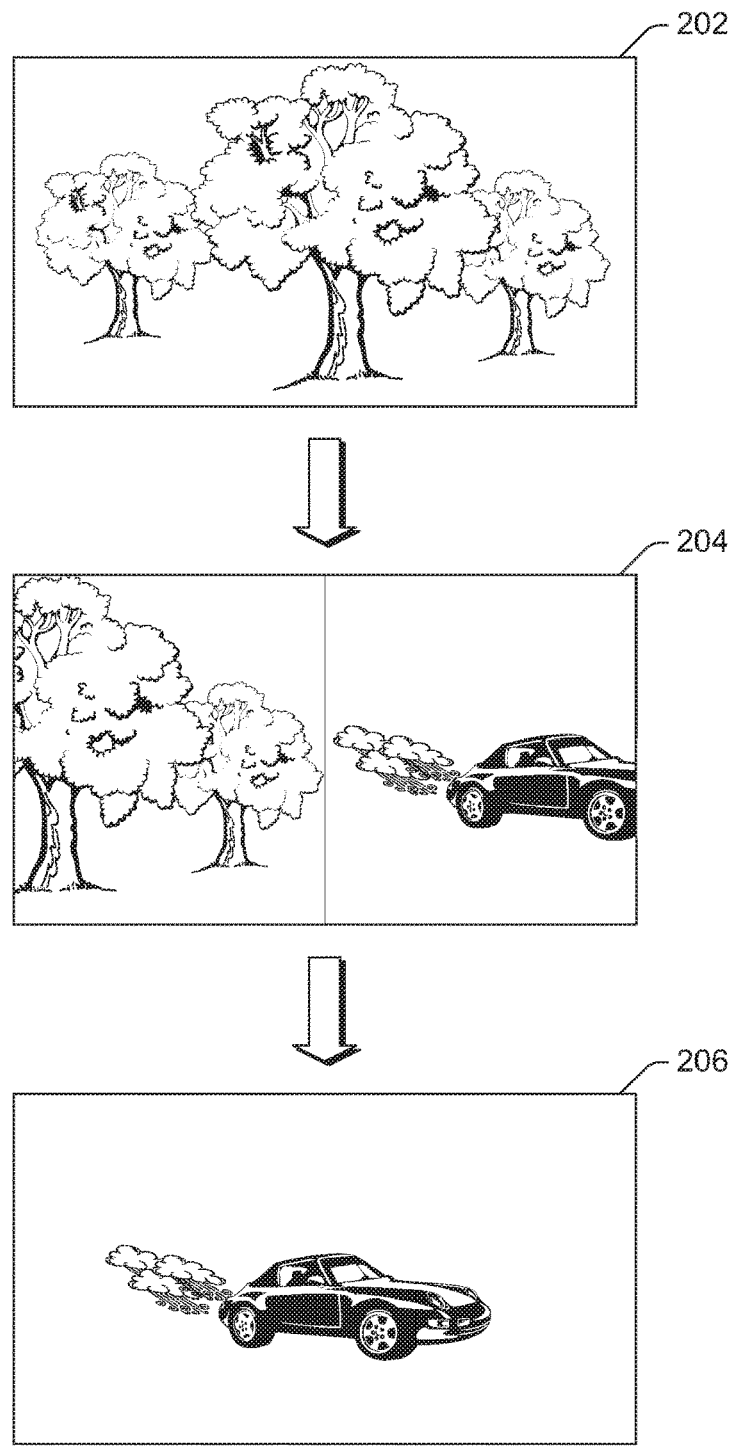
FIG. 2 illustrates an example transitioning from one video preview to another in accordance with one or more embodiments.

FIG. 2 illustrates an example transitioning from one video preview to another in accordance with one or more embodiments. Three displays 202, 204, and 206 are illustrated in FIG. 2, each displaying one or more video previews at different points in time. Each display 202, 204, and 206 can be the same screen, such as screen 108 of FIG. 1. Each display 202, 204, and 206 can alternatively be the same portion of a screen, such as the same window within screen 108 of FIG. 1.

In display 202 a current video preview is being displayed. When it is time to display another video preview (e.g., a next video preview in the playlist to be played back), a presentation module (such as presentation module 106 of FIG. 1) transitions from displaying the current video preview to the other video preview. The current video preview is slid from one edge of the display to the other (from right to left in the example of FIG. 2), giving the appearance of the current video preview being slid off the display (off the left side of the display in the example of FIG. 2). The other video is slid from that same edge of the display to the other, giving the appearance of the current video preview being slid onto the display (from the right hand side in the example of FIG. 2). Thus, in display 204 portions of both the current and the other video preview are displayed concurrently during the transitioning, with the current video preview being approximately half slid off the display and the other video preview being approximately half slid on the display. In display 206, the transitioning to the other video preview has been completed, and the other video preview is displayed.

The presentation module can determine that it is time to transition from displaying the current video preview to another video preview in a variety of different manners as discussed above. For example, the presentation module can determine that it is time to transition from displaying the current video preview to another video preview in response to a user request to play back a different video preview, in response to playback of a video preview finishing, and so forth.

In the example of FIG. 2, the video previews are slid from the right side of the display towards the left side of the display. It should be noted that video previews can be analogously slid in different directions, such as from the left side of the display towards the right side of the display, from the top of the display towards the bottom of the display, from the bottom of the display towards the top of the display, and so forth.

It should also be noted that, when transitioning from one video preview to another, the video previews themselves can be displayed. In such situations, the current video preview is being displayed as it is slid off the display, and the other video preview is being displayed as it is slid onto the display. Alternatively, other images other than the video previews themselves can be displayed. For example, still images (e.g., an image from each video preview) can be displayed during the transition. In such situations, playback of the current video preview stops and a single image of the current video preview is displayed (e.g., the image at the time the transitioning began). Similarly, a single image of the other video preview (e.g., the first image of the other video preview) can be displayed during the transitioning, and playback of the other video preview can begin when the transitioning has completed.

Returning to FIG. 1, in one or more embodiments when display of a video preview begins, presentation module 106 displays metadata associated with the video preview along with the video preview. Presentation module 106 displays the metadata for a particular amount of time, after which module 106 ceases displaying of the metadata. Presentation module 106 resumes displaying the metadata a particular amount of time before display of the video preview is to cease for transition to the next video preview. Once display of the metadata is resumed, presentation module 106 can continue displaying the metadata for an amount of time (e.g., until display of the video preview ceases). Additionally, presentation module 106 can resume displaying the metadata in response to various user inputs (e.g., as discussed above with reference to input module 104), such as the user raising his or her arms, touching a particular part of a remote control device, and so forth. Alternatively, the metadata can be displayed for as long as the video preview is displayed.

Figure 3:
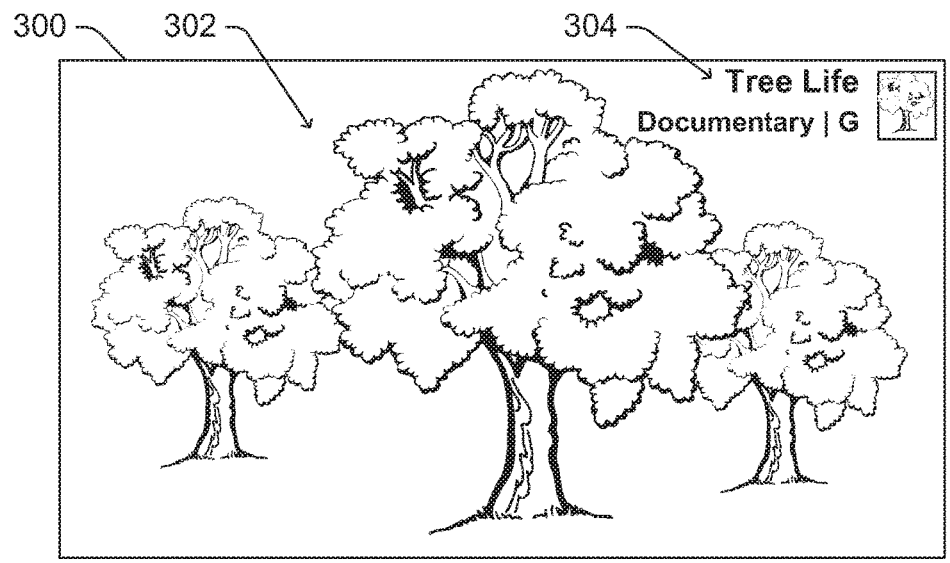
FIG. 3 illustrates an example of displaying metadata with a video preview in accordance with one or more embodiments.

FIG. 3 illustrates an example of displaying metadata with a video preview in accordance with one or more embodiments. A display 300 is illustrated in FIG. 3, which can be a screen (such as screen 108 of FIG. 1) or a portion of a screen (such as a window within screen 108 of FIG. 1). Display 300 includes the video preview 302 and metadata 304. In the example of FIG. 3, metadata 304 includes, for the video program corresponding to the video preview: a title ("Tree Life"), a genre ("Documentary"), a rating ("G"), and box art (an image of a tree). Alternatively, other metadata associated with the video program corresponding to the video preview can be illustrated.

Additionally, in one or more embodiments, a hint of a next video preview and/or a previous video preview in the playlist is displayed to the user, giving the user an indication of the next and/or previous video preview that they will be seeing. A variety of different metadata for the video program corresponding to the video preview can be displayed as the hint. The hint can be displayed in different manners, such as in a small window on the right side or bottom of the display (for the next video preview) or the left side or top of the display (for the previous video preview), overlaying the right side or bottom of the display (for the next video preview) or overlaying the left side or top of the display (for the previous video preview), and so forth.

The hint of the next video preview and/or a previous video preview in the playlist can be displayed at different times. For example, the hint of the previous video preview can be displayed for a particular amount of time after playback of the current video preview begins. By way of another example, the hint of the next video preview can be displayed a particular amount of time before playback of the current video preview is to cease (e.g., due to playback of the current video preview finishing).

Figure 4:
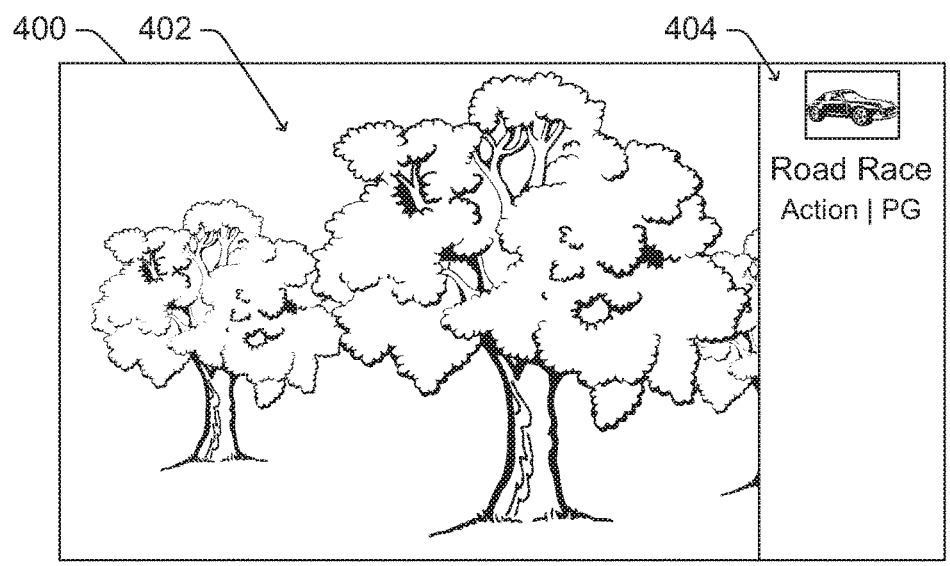
FIG. 4 illustrates an example of displaying a hint with a video preview in accordance with one or more embodiments.

FIG. 4 illustrates an example of displaying a hint with a video preview in accordance with one or more embodiments. A display 400 is illustrated in FIG. 4, which can be a screen (such as screen 108 of FIG. 1) or a portion of a screen (such as a window within screen 108 of FIG. 1). Display 400 includes the video preview 402 and hint 404. In the example of FIG. 4, hint 404 includes, for the video program corresponding to the next video preview in the playlist: a title ("Road Race"), a genre ("Action"), a rating ("PG"), and box art (an image of a car). Alternatively, other metadata for the video program corresponding to the next video preview can be illustrated.

Additionally, it should be noted that both the hint of the next video preview and/or a previous video preview in the playlist can be displayed concurrently with metadata associated with the video preview. For example, both metadata 304 of FIG. 3 and hint 404 of FIG. 4 can be displayed concurrently (e.g., adjacent to one another or in other locations on the display).

While a video preview is being displayed to the user, the user can request to take one or more actions regarding the video program corresponding to the video preview, such as purchasing the video program, renting the video program, and so forth. A user can request to take an action by providing a variety of different inputs (e.g., as discussed above with reference to input module 104 of FIG. 1). For example, a user can select a "purchase" button or option displayed along with the metadata (e.g., metadata 304 of FIG. 3) to purchase the video program corresponding to the video preview, the user can select a "rent" button or option displayed along with the metadata (e.g., metadata 304 of FIG. 3) to rent the video program corresponding to the video preview, and so forth. Thus, the user can browse through available video programs by watching the various video previews, and then purchase, rent, or take some other action regarding a desired video program based on the video preview the user watched.

In one or more embodiments, a user can request to take an action by selecting a particular button or option (e.g., on a remote control device, displayed on the screen with the video preview, etc.) to display an acquisition interface. In response to such a user request, an acquisition interface is displayed for the video program corresponding to the video preview, and the user can provide various inputs to identify a desired action.

Figure 5:
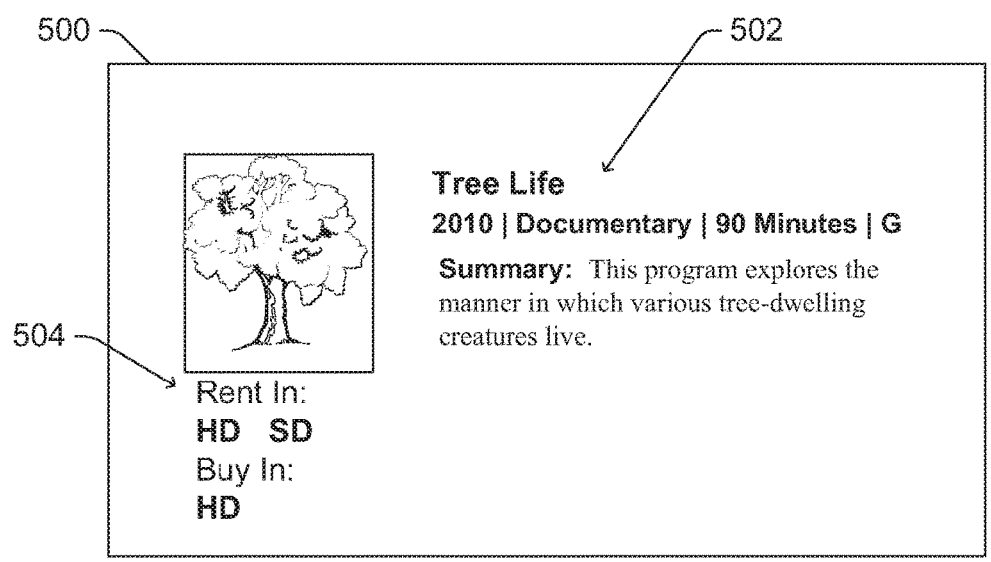
FIG. 5 illustrates an example acquisition interface in accordance with one or more embodiments.

FIG. 5 illustrates an example acquisition interface in accordance with one or more embodiments. A display 500 is illustrated in FIG. 5, which can be a screen (such as screen 108 of FIG. 1) or a portion of a screen (such as a window within screen 108 of FIG. 1). Display 500 includes metadata 502 for the video program, including: a title ("Tree Life"), a year of release ("2010"), a genre ("Documentary"), a length ("90 Minutes"), a rating ("G"), box art (an image of a tree), and a summary. Alternatively, other metadata for the video program corresponding to the next video preview can be illustrated.

Display 500 also includes multiple acquisition options, including the option to rent the video program in a high definition (HD) or standard definition (SD) format, and an option to purchase the video program in an HD format. Other options can alternatively be included, such as an option to purchase the video program in an SD format, an option to display a longer video preview for the video program, an option to add the video program to a "wish list" of the user, an option to add the video program to a queue of video programs to be sent to the user in another format (e.g., optical discs such as DVDs), and so forth. A user can select any of these options by providing a variety of different inputs (e.g., as discussed above with reference to input module 104 of FIG. 1) to select a button, select a menu option, and so forth. An indication of the user selected option is provided to video acquisition service 112 of FIG. 1, which takes an appropriate action based on the user selected option (e.g., charges the user's account for the rental of the video program and begins providing the rented video program to presentation module 106 of FIG. 1 for playback, adds the video program to a wish list of the user, and so forth).

Alternatively, rather than displaying acquisition interface as illustrated in FIG. 5, the multiple acquisition options can be displayed to the user while the video preview is being played back. For example, one or more acquisition options (e.g., as illustrated in display 500) can be displayed along with the metadata that is displayed while the video preview is displayed, such as concurrently with (e.g., and adjacent to) metadata 304 on display 300 of FIG. 3.

Figure 6:
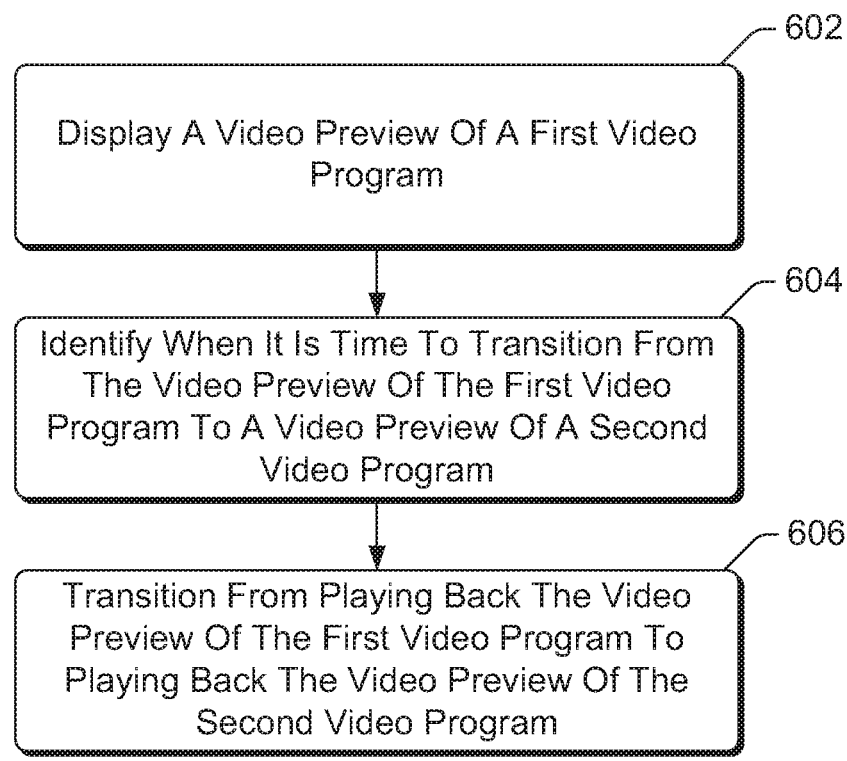
FIG. 6 is a flowchart illustrating an example process for implementing the video preview based browsing user interface in accordance with one or more embodiments.

FIG. 6 is a flowchart illustrating an example process 600 for implementing the video preview based browsing user interface in accordance with one or more embodiments. Process 600 is carried out by a computing system, such as computing system 100 of FIG. 1, and can be implemented in software, firmware, hardware, or combinations thereof. Process 600 can be carried out, for example, by a presentation module of a computing system, such as presentation module 106 of FIG. 1. Process 600 is shown as a set of acts and is not limited to the order shown for performing the operations of the various acts. Process 600 is an example process for implementing the video preview based browsing user interface; additional discussions of implementing the video preview based browsing user interface are included herein with reference to different figures.

In process 600, a video preview of a first video program is displayed (act 602). Associated audio content can also be played back, as discussed above.

An identification is made as to when it is time to transition from the video preview of the first video program to a video preview of a second video program (act 604). This identification can be made in different manners, such as when playback of the video preview of the first video program has finished, in response to a user input, and so forth. This video preview of the second video program can be a next video preview in a playlist, a previous video preview in a playlist, or another video preview as discussed above.

In response to identifying it is time to transition from the video preview of the first video program to a video preview of a second video program, the computing system transitions from playing back the video preview of the first video program to playing back the video preview of the second video program (act 606). This transition can be made, for example, by sliding the video preview of the first video program off the display while sliding the video preview of the second video program onto the display, with at least a portion of both of the video previews being displayed concurrently during the transitioning, as discussed above.

Figure 7:
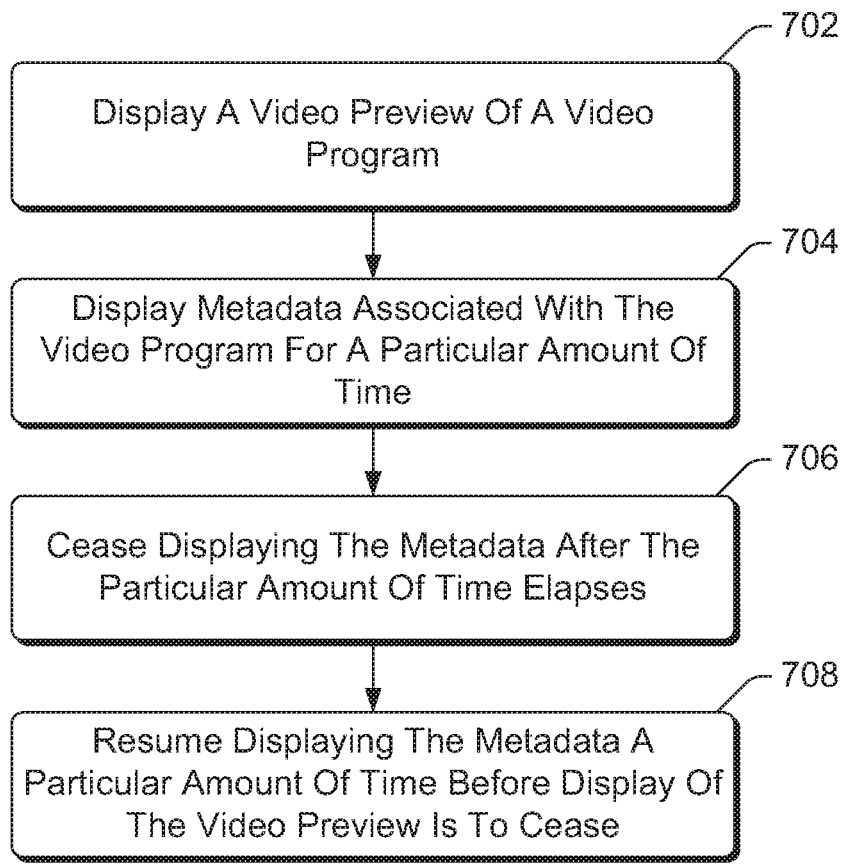
FIG. 7 is a flowchart illustrating another example process for implementing the video preview based browsing user interface in accordance with one or more embodiments.

FIG. 7 is a flowchart illustrating another example process 700 for implementing the video preview based browsing user interface in accordance with one or more embodiments. Process 700 is carried out by a computing system, such as computing system 100 of FIG. 1, and can be implemented in software, firmware, hardware, or combinations thereof. Process 700 can be carried out, for example, by a presentation module of a computing system, such as presentation module 106 of FIG. 1. Process 700 is shown as a set of acts and is not limited to the order shown for performing the operations of the various acts. Process 700 is an example process for implementing the video preview based browsing user interface; additional discussions of implementing the video preview based browsing user interface are included herein with reference to different figures.

In process 700, a video preview of a video program is displayed (act 702). Video content of the video preview is displayed in act 702, and audio content associated with the video content can also be played back, as discussed above.

Metadata associated with the video program is also displayed for a particular amount of time (act 704). The metadata associated with the video program is displayed in act 704 concurrently with the display of the video preview in act 702. The particular amount of time that the metadata is displayed can vary, such as being on the order of 5-10 seconds (although other amounts of time can alternatively be used). Displaying of the metadata can begin abruptly, or alternatively can be phased in (e.g., over a period of 1-2 seconds) in which the metadata becomes increasingly brighter. The metadata can be displayed overlaying the video preview, in a separate window, or alternatively elsewhere.

Displaying of the metadata ceases after the particular amount of time elapses (act 706). Although displaying of the metadata ceases in act 706, displaying of the video preview continues. Displaying of the metadata can cease abruptly, or alternatively can be phased out (e.g., over a period of 1-2 seconds) in which the metadata becomes increasingly dimmer until no longer being displayed.

Displaying of the metadata resumes a particular amount of time before display of the video preview is to cease (act 708). Analogous to act 704, displaying of the metadata can begin abruptly, or alternatively can be phased in. The metadata associated with the video program is displayed in act 708 concurrently with the display of the video preview in act 702. This metadata in act 708 can be the same metadata as was displayed in act 704, or alternatively different metadata associated with the video program. The particular amount of time before display of the video preview is to cease is, for example, a particular amount of time before playback of the video preview finishes. This particular amount of time in act 708 can be the same as, or alternatively shorter or longer than, the particular amount of time in act 704. Resuming display of the metadata prior to when display of the video preview is to cease can serve, for example, as a reminder to the user that the video preview is about to end so that he or she can request to take one or more actions regarding the video program corresponding to the video preview before the video preview ends. Process 700 can then be repeated for each additional video preview that is displayed.

Returning to FIG. 1, it should be noted that presentation module 106 can support various other features when playing back video previews. In one or more embodiments, presentation module 106 displays playback control buttons (e.g., fast forward, rewind, pause, skip to next, skip to previous, etc.) on screen 108. These playback control buttons can be displayed while a video preview is being displayed, or alternatively in response to a particular user action (e.g., a user picking up a remote control device, a user raising his or her hands (or arms), and so forth). A user can select any of these playback control buttons by providing a variety of different inputs (e.g., as discussed above with reference to input module 104 of FIG. 1). Alternatively, rather than displaying playback control buttons on screen 108, one or more buttons of a remote control device can be used as playback control buttons. When a playback control button (whether displayed on screen 108 or included on a remote control device) is selected, presentation module 106 performs the requested playback control.

Additionally, in one or more embodiments no video preview corresponding to a particular video program may be available. For example, no video preview may be included in video library 116. In such situations, video preview service 114 provides one or more images to be displayed by presentation module 106 in place of a video preview for that particular video program. These images can include, for example, various metadata for the video program, such as a title, box art, summary, and so forth.

Furthermore, situations can arise in which the video programs are different episodes of a larger program or series, such as different episodes of a television program. In one or more embodiments, when such situations are encountered, video preview service 114 selects a particular video preview to provide to presentation module 106 for all of the video programs. This particular selected video preview is, for example, a video preview for a pilot episode of the television program, a video preview for the one of the episodes that has the earliest release (e.g., broadcast) date, and so forth. Different episodes may still have different video previews, but video preview service 114 provides the particular selected video preview to presentation module 106. Thus, a user watching the video preview for the larger program or series sees a video preview for an early (e.g., first or pilot) episode of the program. Such an early episode of the program is more likely to be understood by a user unfamiliar with the program, and is less likely to divulge secrets or plot twists that appear in later episodes.

Figure 8:
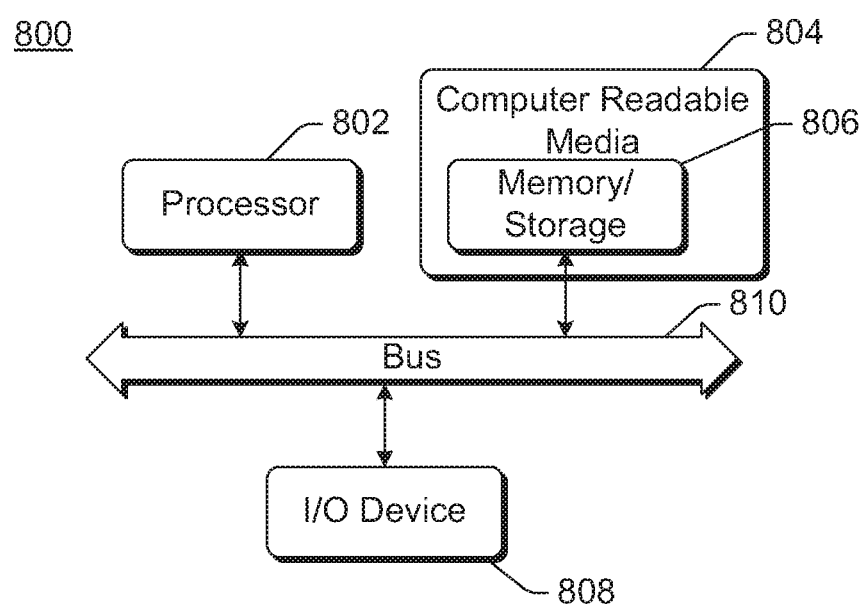
FIG. 8 illustrates an example computing device that can be configured to implement at least part of the video preview based browsing user interface in accordance with one or more embodiments.

FIG. 8 illustrates an example computing device 800 that can be configured to implement at least part of the video preview based browsing user interface in accordance with one or more embodiments. Computing device 800 (or portions thereof) can be used to implement, for example, one or more of input module 104, presentation module 106, screen 108, speaker 110, video acquisition service 112, video preview service 114, and video library 116 of FIG. 1.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the video preview based browsing user interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for transitioning between video previews that are displayed on a display device, the method comprising:
   playing back a first video preview, the first video preview corresponding to a first video program;
   while playing back the first video preview, displaying metadata associated with a second video preview corresponding to a second video program;
   identifying when it is time to transition from playing back the first video preview to playing back the second video preview; and
   in response to said identifying:
   a) when the second video preview is available, transitioning from playing back the first video preview to playing back the second video preview by phasing the first video preview off the display device while phasing the second video preview onto the display device;
   b) when the second video preview is not available, transitioning from playing back the first video preview to playing back a still image for the second video preview by phasing the first video preview off the display device while phasing the still image for the second video preview onto the display device, wherein at least a portion of the first video preview and at least a portion of the still image for the second video preview are displayed concurrently during the transitioning.

2. The method as recited in claim 1, wherein at least a portion of the first video preview and at least a portion of the second video preview are played back concurrently during the transitioning.

3. The method as recited in claim 1, wherein the second video preview is a next video preview after the first video preview in a playlist.

4. The method as recited in claim 1, wherein the second video preview is a previous video preview prior to the first video preview in a playlist.

5. The method as recited in claim 1, wherein the identifying comprises identifying it is time for the transition when playback of the first video preview finishes.

6. The method as recited in claim 1, wherein the identifying comprises identifying it is time for the transition in response to a user request to play back a different video preview.

7. The method as recited in claim 1, further comprising:
   displaying, concurrently with playing back the first video preview, metadata identifying content of the first video program a first amount of time before playback of the first video preview ceases;
   displaying, concurrently with playing back the second video preview, metadata identifying content of the second video program for a second amount of time after playback of the second video preview begins; and
   ceasing display of the metadata for the second video program after the second amount of time elapses.

8. The method as recited in claim 1, wherein the first video program comprises an episode of a series, and wherein the first video preview comprises a video preview for an episode of the series having an earliest release date.

9. A system for transitioning between video previews displayed on a display device, the system comprising:
   one or more processors; and
   a memory having instructions that are executable by the one or more processors to perform operations comprising:
   playing back a first video preview, the first video preview corresponding to a first video program;
   while playing back the first video preview, displaying metadata associated with a second video preview corresponding to a second video program;
   identifying when it is time to transition from playing back the first video preview to playing back the second video preview in response to:
   identifying that a time has elapsed to automatically transition from playing back the first video preview to playing back the second video preview; or
   prior to the time elapsing, receiving a navigation input that indicates to play back the second video preview; and
   in response to said identifying:
   a) when the second video preview is available, transitioning from playing back the first video preview to playing back the second video preview by phasing the first video preview off the display device while phasing the second video preview onto the display device; and
   b) when the second video preview is not available, transitioning from playing back the first video preview to playing back a still image for the second video preview by phasing the first video preview off the display device while phasing the still image for the second video preview onto the display device, wherein at least a portion of the first video preview and at least a portion of the still image for the second video preview are displayed concurrently during the transitioning.

10. The system as recited in claim 9, wherein the navigation input corresponds to a user request to play back a next video preview.

11. The system as recited in claim 9, wherein the navigation input corresponds to a user request to play back a previous video preview that was played back before playback of the first video preview.

12. The system as recited in claim 9, wherein the navigation input corresponds to a user request configured as a search for the second video program.

* * * * *